(12) United States Patent
Maeurer et al.

(10) Patent No.: US 8,138,232 B2
(45) Date of Patent: Mar. 20, 2012

(54) METHOD FOR RECYCLING PLASTIC MATERIALS AND USE THEREOF

(75) Inventors: Andreas Maeurer, Freising (DE); Martin Schlummer, Ingolstadt (DE); Otto Beck, Langenbach (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 98 days.

(21) Appl. No.: 11/916,889

(22) PCT Filed: Jun. 8, 2006

(86) PCT No.: PCT/EP2006/005503
§ 371 (c)(1),
(2), (4) Date: Jul. 2, 2008

(87) PCT Pub. No.: WO2006/131376
PCT Pub. Date: Dec. 14, 2006

(65) Prior Publication Data
US 2008/0281002 A1    Nov. 13, 2008

(30) Foreign Application Priority Data
Jun. 8, 2005   (DE) .................... 10 2005 026 451

(51) Int. Cl.
*C08J 11/04* (2006.01)
(52) U.S. Cl. ............. 521/40; 521/40.5; 521/46; 521/47; 528/480; 528/493; 528/495; 528/499; 528/502 A
(58) Field of Classification Search .............. 521/40, 521/40.5, 47, 48, 50, 48.5, 44, 45, 49, 49.5, 521/49.8; 528/480, 493, 494, 495, 496, 497, 528/498, 499, 501, 502 R, 502 C, 502 D, 528/502 E, 502 F, 503
See application file for complete search history.

(56) References Cited

U.S. PATENT DOCUMENTS

| 4,164,484 | A | 8/1979 | Kajimoto et al. |
| 5,994,417 | A | 11/1999 | Roberts et al. |
| 2003/0191202 | A1* | 10/2003 | Maurer et al. ............ 521/40 |

(Continued)

FOREIGN PATENT DOCUMENTS

DE   44 35 191 A1   4/1996
(Continued)

OTHER PUBLICATIONS

English translation of the claims of EP 1438351. This is corresponding to DE 10207333 and WO 03/035729 which were previously referenced in Information Disclosure Statement dated Jan. 18, 2008.

(Continued)

*Primary Examiner* — James J Seidleck
*Assistant Examiner* — Frances Tischler
(74) *Attorney, Agent, or Firm* — Millen, White, Zelano, Branigan, P.C.

(57) ABSTRACT

The invention relates to a method for recycling plastic materials which contain at least two polymers, copolymers or blends thereof based on polystyrene. The plastic material is thereby mixed with a solvent for the polymers, copolymers or blends. Subsequently a precipitation is effected by addition of a corresponding precipitant so that then the gelatinous precipitation product can be separated from the further components of the plastic material. The method is used for recycling of any plastic materials, in particular of plastic materials from electronic scrap processing and from shredder light fractions.

23 Claims, 1 Drawing Sheet

U.S. PATENT DOCUMENTS

2004/0035757 A1 * 2/2004 Vandeputte .................... 209/44

FOREIGN PATENT DOCUMENTS

| DE | 102 07 333 A1 | 10/2001 |
| DE | 102 07 336 A1 | 5/2003 |
| EP | 0739930 A2 | 4/1996 |
| WO | WO 02/38660 A | 5/2002 |
| WO | WO 03/035729 A | 5/2003 |

OTHER PUBLICATIONS

Uddin, M.A., et al.; "Dehydrohalogenation during pyrolysis of brominated flame retardant containing high impact polystyrene . . ." Fuel; 2002; pp. 1819-1825; vol. 81.

Maeurer, Andreas., et al. "Good as New"; Waste Management World; May-Jun. 2004; pp. 33-43.

* cited by examiner

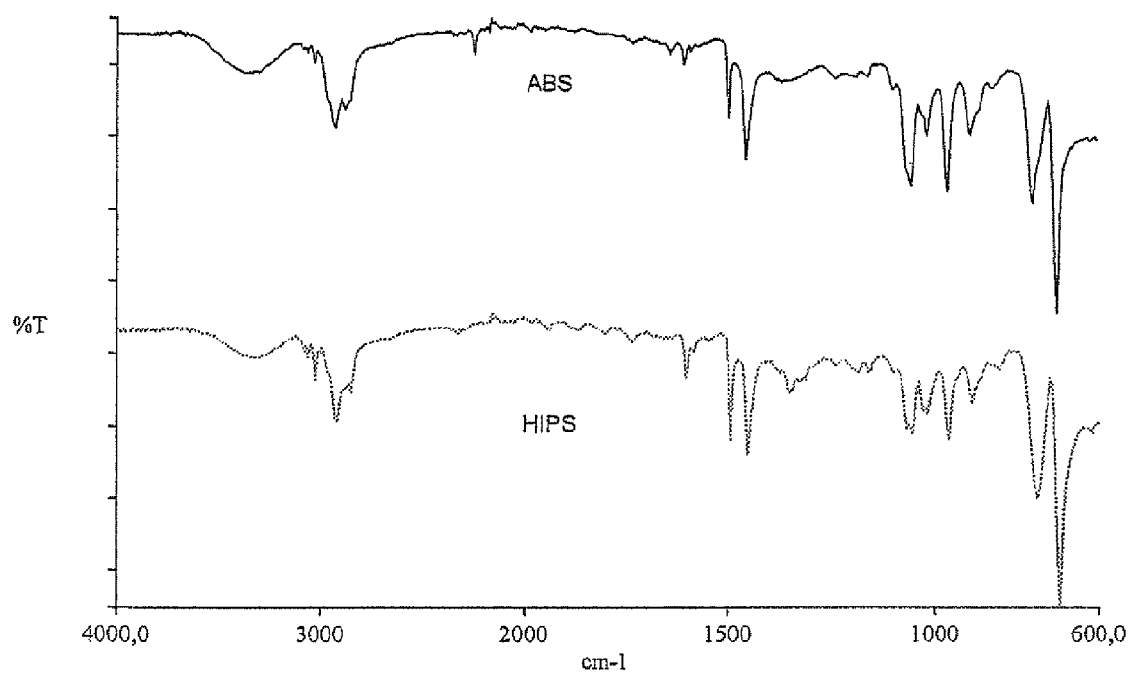

METHOD FOR RECYCLING PLASTIC MATERIALS AND USE THEREOF

The invention relates to a method for recycling plastic materials which contain at least two polymers, copolymers or blends thereof based on polystyrene.

Approx. 6 million tones of old electrical appliances accumulate in Europe every year. Approximately a fifth of this waste is plastic materials. The EU Guideline 2002/96/EC (WEEE Directive) demands high salvage quotas which can only be achieved with a material recycling method for the plastic material fractions.

However, material recycling for plastic materials from old electrical appliances is not state of the art because of the high pollutant content thereof and because of the material diversity thereof. There should be mentioned above all as pollutants the obsolete brominated flame-retardant additives with a high potential for dioxin formation.

Because of the polymer diversity in old electrical appliances, very effective sorting and plastic material separation and reprocessing would be necessary in order to produce high quality recyclates which achieve virgin material specifications.

This necessary separation technology has not been available to date, the normal separation methods based on different density, electrostatics, brittleness, optical properties etc. fail here.

In order to dispose of plastic material waste finished with brominated flame-retardant additives, thermal and raw material methods have been developed (Uddin, M. A.; Bhaskar, T.; Kaneko J.; Muto A.; Sakata, Y.; Matsui, T. (2002) "Dehydrohalogenation during pyrolysis of brominate flame retardant containing high impact polystyrene (HIPS.Br) mixed with polyvinylchloride (PVC), Fuel 81, pp. 1819-1825). It is disadvantageous that new petrochemical raw materials are thereby produced at best or merely the calorific value of the plastic materials is used.

For high-grade material recycling of the contained plastic materials, already various solvent-based, i.e. physical methods, have been developed in order to separate the brominated flame-retardant additives in the laboratory and on a small industrial scale (Mäurer, A., Schlummer, M. (2004) "Good As New. Recycling plastics from WEEE and packaging waste", Waste Management World, May-June 2004, pp. 33-43). The inadequate specificity of the solvents used is disadvantageous in these conversion methods. From non-homogeneous polymer mixtures, in addition to the actual target polymer, also other polymers and components, such as additives or degradation products are jointly extracted. Whilst the jointly dissolved low molecular substances, i.e. additives or degradation products, can be reduced for example by polymer precipitation by means of a precipitant, the separation of incompatible polymers which are dissolved or dispersed together is not successful.

Typical examples of these incompatible polymers are acrylonitrile-butadiene-styrene (ABS) and polystyrene (PS) or ABS and styrene-butadiene (SB) which are used very frequently in electrical appliances as housing materials and therefore have great relevance with respect to quantity in old electrical appliance waste.

A polymer solution, in which polymers which are incompatible with each other or are non-miscible are dispersed, is produced thus from typical plastic material-containing old electrical appliance (EAG) fractions. After separation of the solvent, a mixture comprising incompatible plastic materials which do not achieve satisfactory properties are obtained.

Starting herefrom, it was the object of the present invention to provide a method for recycling plastic materials which eliminates the described disadvantages of the state of the art and enables simple recovery of polymers based on polystyrene, a simple and hence economical method control being intended to be ensured.

The object is achieved by a method for recycling plastic materials which contain at least two polymers, copolymers or blends thereof based on polystyrene in which the plastic material is mixed with at least one solvent for the polymers, copolymers or blends thereof at least one precipitant which is miscible with the at least one solvent is added to the solution of the polymers, copolymers or blends thereof for precipitation of the at least one polymer, copolymer or blend thereof in gelatinous form, the at least one precipitant and/or the quantity thereof being chosen such that the mixture of solvent and precipitant has a value for the hydrogen bonding strength $\delta_H$ of the Hansen solubility parameter of 10 to 15 $\sqrt{MPa}$ and the at least one gelatinous precipitation product is separated from the further components of the plastic material. The invention also relates to the embodiments claimed and disclosed herein and also the use of the method for recycling plastic materials with a proportion of polystyrene, copolymers and/or blends thereof. The further dependent claims reveal advantageous developments.

According to the invention, a method for recycling plastic materials which contain at least two polymers, copolymers or blends thereof based on polystyrene is provided. The method is thereby based on the following method steps:

a) the plastic material is mixed with at least one solvent for the polymers, copolymers or blends thereof.

b) at least one precipitant which is miscible with the at least one solvent is added to the solution of the polymers, copolymers or blends thereof. The result thereby is precipitation of the at least one polymer, copolymer or blend thereof in gelatinous form. It is hereby crucial that the precipitant and/or the quantity of the precipitant is chosen in a ratio to the solvent such that the mixture of solvent and precipitant has a value for the hydrogen bonding strength $\delta_H$ of the Hansen solubility parameter of 10 to 15 $\sqrt{MPa}$.

c) the at least one gelatinous precipitation product is subsequently separated from the further components of the plastic material.

It is a particular feature of the present invention that two incompatible polymers, which are based on polystyrene, can be separated in this way as two separate phases.

There should be understood by plastic materials within the scope of the present application both plastic materials or mixtures thereof but also quite generally composite materials with other materials.

The method according to the invention thereby confers the advantage that the precipitation can be effected surprisingly in economical and robust agitation tanks at low temperatures, preferably below 100° C., as a result of which no thermal damage occurs to the polymers. The polymer phases are thereby separated on the basis of their different material properties to form highly pure products which have very good rheological and mechanical properties so that they can be used respectively as a substitute for virgin material.

A further essential advantage resides in the fact that the quantity of solvent used can be reduced so far that the operation can take place with polymer gel and the solvent residue can be withdrawn mechanically in an economical manner. The separation of the remaining solvent is then effected in parallel and directly subsequent to the phase separation.

This method can be transferred to a large industrial scale without high investment costs—as are required for extruders, kneaders—and avoids large and expensive volumes of solvent. Hence the operating costs can be kept low because of the small circulating quantities of solvent which are to be processed by distillation, which leads to a low thermal energy requirement.

No thermal-mechanical stressing of the polymer takes place, as a result of which material damage and molecular weight degradation are avoided. The original polymer properties and the polymer quality are maintained.

Preferably at least two precipitation products occur in gelatinous form. Because of the adhesion properties of the similar precipitation products, the result is then demixing of the various polymers, as a result of which the latter can be separated in a simple manner.

When thoroughly mixing solvent and precipitant, it is thereby preferred that the adhesion forces outweigh the dispersion energy supplied by the thorough mixing so that the at least one gelatinous precipitation product is demixed completely from the further components of the plastic material.

Preferably the mixture of solvent and precipitant has a polarity, expressed by a value for the hydrogen bonding strength $\delta_H$ of the Hansen solubility parameter of 11 to 13 $\sqrt{MPa}$.

There are possible as solvent fundamentally all solvents which are suitable for polymers, copolymers or blends based on polystyrene. Examples of these are mentioned in Saechtling, Plastic Material Handbook, 28th Edition (2003), page 691 and also DE 102 07 333 A1 and EP 739 930 A1, the relevant content of which is the subject of the present invention.

Preferably, in the method according to the invention for dissolving polymers, solvents selected from the group comprising ketones, ether, cycloalkanes, esters, in particular acetone, methylethylketone, tetrahydrofuran, dialkylester of dicarboxylic acids and fatty acid alkylester, e.g. fatty acid methylester (FA-ME) are used.

In the precipitation in step b), preferably a compound is used as precipitant selected from the group comprising water, alcohols, in particular methanol, ethanol, isopropanol, n-propanol and butanol or mixtures thereof.

A preferred variant of the method according to the invention provides that, subsequent to step a), the non-soluble components of the composite materials are separated mechanically. There should be mentioned here as mechanical separation possibilities in particular filtration or sedimentation.

Preferably the precipitation of the polymers is implemented at temperatures up to 170° C., preferably at temperatures up to 100° C. and particularly preferred in the temperature range of room temperature (20° C.) to 50° C.

In a preferred variant, the at least one precipitation product is dried before separation in step c). Another preferred variant provides that the drying of the at least one precipitation product is effected only after separation in step c).

The drying according to the invention of the precipitation product in step c) is effected preferably by means of a rotational evaporator or a tumble dryer.

The separated polymer phases can be pressed through perforated matrices to form strands without heating, the remaining solvent is thereby further dried and consequently granulated.

Due to the omission of heating, an energy saving and gentler treatment of the material can be achieved relative to the state of the art. A further advantage resides in the fact that the polymers no longer adhere because of the drying and thus can be granulated directly.

The granulates produced can be handled without further processing on normal machines. The produced particles display perfect drawing behaviour.

The polymers which can be recycled in the method according to the invention and are based on polystyrene are preferably selected from the group comprising styrene-butadiene (SB), styrene-acrylonitrile (SAN), acrylonitrile-butadiene-styrene (ABS), acrylic ester-styrene-acrylonitrile (ASA), polyphenyleneoxide (PPO) and blends thereof, in particular ABS/PC, ABS/PA and PPO/PS.

It is likewise possible that the plastic materials reprocessed according to the method according to the invention contain further polymer components. With respect to the further polymer components, all the polymers known from prior art can be used, polymers from the group comprising polyolefins, polyamides, polyvinylchlorides, polyurethanes, polycarbonates, polyacrylates, polymethacrylates, polyester resins, epoxy resins, polyoxyalkylenes, polyalkylene terephthalates and polyvinyl butyral and also copolymers and blends thereof being preferred.

Further polymer components of this type can be separated preferably in a preceding step by means of a density separation of the polymers based on polystyrene. It is thereby also possible to separate further non-polymer components of the plastic material in a preceding density separation of this type.

It is provided in a further preferred variant that the plastic material to be reprocessed contains additional low molecular additives. There is thereby preferred as a low molecular additive for example a flame-retardant additive or a softener.

There should hereby be mentioned as flame retardants in particular brominated flame retardants, in particular selected from the group comprising polybrominated diphenylethers, polybrominated biphenylene, bis-[dibromopropoxydibromophenyl]propane and bis-(tribromophenoxy)ethane.

With respect to the softeners, there are preferred in particular compounds selected from the group comprising phthalic acid esters, adipinic acid esters, aliphatic $C_4$-$C_8$ carboxylic acids and polyalkylene glycols.

Low molecular additives of this type remain in step b) in the solution and thus can preferably be separated from the precipitated polymers.

The method according to the invention is used for recycling plastic materials with a proportion of polystyrenes, copolymers and/or blends thereof. There are included herein in particular plastic materials from electronic scrap processing and from shredder light fractions.

The subject according to the invention is intended to be explained in more detail with reference to the subsequent FIGURE and example without restricting the latter to the embodiments shown here.

The FIGURE shows a Fourier transform infrared spectrum of two separated polymers, one spectrum relating to polystyrene (HIPS) of high impact strength and the other spectrum to acrylonitrile-butadiene (ABS).

EXAMPLE 1

The solution of the plastic material waste is effected in a 10 l agitation reactor. For this purpose, the comminuted and air-sorted material of an E-scrap shredder light fraction in 30% batches is mixed with the formulation CreaSolv-CT (from CreaCycle GmBH) and dissolved at room temperature.

The filtration of the solution is effected via a 2 mm and a 400 μm sieve. A part of the solution is finely filtered via a tissue filter with the mesh width 20-β mesh (triangles of edge length 60 μm).

After the filtration, approx. 6.4 kg material are present as coarsely filtered and approx. 1.3 kg as finely filtered solution. The polymer separation is implemented individually in two independent tests with each solution.

The coarsely filtered solution is separated in a small industrial 100 l agitation tank with the precipitant formulation CreaSolv-PS-F1.1 (from CreaCycle GmBH) and the precipitated product is separated from the remainder.

The finely filtered solution is likewise precipitated.

The extracted precipitation products have a solvent middle proportion of approx. 60% and are firstly dried on the rotational evaporator.

Two polymer gels which have different adhesion properties and separate are produced.

The separated polymer gels are dried further respectively individually in a laboratory kneader (2.4 l nominal volume) under a slight vacuum (200 mbar) and consequently the residual solvent is drawn off. The gels thereby disintegrate into extrudable polymer particles.

In the course of the sample production, a part of the coarsely filtered solution was processed into a mixed styrene copolymer (sample MIXex). The other part was divided in the course of drying into two fractions (sample BLACKex and sample GREYex).

The finely filtered solution was precipitated, dried with phase separation, the thereby resulting two polymer phases were separated from each other and processed into the samples BLACKff and GREYff.

The products BLACK and GREY were investigated by means of FT-IR and were characterised by means of data base balancing as ABS (sample BLACK) and HIPS (sample GREY) (FIGURE).

The IR investigations which were implemented prove the high separation performance of the phase separation: No traces of the respectively other polymer are found in the separated polymers.

As first orientating investigation for thermoplastic processing, MFI strands were produced (220-240°, 10 kg), by means of which the elasticity and the surface condition of the products was tested qualitatively. Products GREYff and GREYex hereby proved to be very elastic, the samples BLACKff, BLACKex and MIXex behaved in a comparatively brittle manner without extrusion.

The finely filtered samples display the better results with respect to surface condition.

The invention claimed is:

1. Method for recycling plastic materials which contain at least two polymers, copolymers or blends thereof, each of which is based on polystyrene in which
   a) the plastic material is mixed with at least one solvent for the polymers, copolymers or blends thereof
   b) at least one precipitant which is miscible with the at least one solvent is added to the solution of the polymers, copolymers or blends thereof for precipitation of the at least one polymer, copolymer or blend thereof in gelatinous form, the at least one precipitant and/or the quantity thereof being chosen such that the mixture of solvent and precipitant has a value for the hydrogen bonding strength $\delta_H$ of the Hansen solubility parameter of 10 to 15 $\sqrt{MPa}$ and
   c) at least two gelatinous precipitation products, each with different adhesion properties, are separated from each other by thoroughly mixing so that the adhesion forces outweigh the dispersion energy supplied by the thorough mixing so that the at least two gelatinous precipitation products are demixed completely from each other and the further components of the plastic material.

2. A method according to claim 1, wherein the mixture of solvent and precipitant has a value for the hydrogen bonding strength $\delta_H$ of the Hansen solubility parameter of 11 to 13 $\sqrt{MPa}$.

3. A method according to claim 1, wherein the solvent in a) is selected from the group comprising ketones, ether, cycloalkanes, esters, in particular acetone, methylethylketone, tetrahydrofuran, dialkylester of dicarboxylic acids and fatty acid alkylester.

4. A method according to claim 1, wherein the precipitant in b) is selected from the group comprising water, alcohols, in particular methanol, ethanol, isopropanol, n-propanol and butanol or mixtures thereof.

5. A method according to claim 1, wherein after step a), components of the composite material which are non soluble are separated mechanically.

6. A method according to claim 1, wherein the mechanical separation is effected by filtration.

7. A method according to claim 1, wherein the precipitation is effected at temperatures up to 170° C.

8. A method according to claim 1, wherein the precipitation is effected at temperatures up to 100° C.

9. A method according to claim 1, wherein at least one precipitation product is dried before separation in step c).

10. A method according to claim 1, wherein at least one precipitation product is dried after separation in step c).

11. A method according to claim 9, wherein the drying is effected by means of rotational evaporation.

12. A method according to claim 1, wherein subsequently the at least one separated polymer gel is pressed through perforated matrices to form strands.

13. A method according to claim 1, wherein the copolymers and blends of polystyrene are styrene-butadiene (SB), styrene-acrylonitrile (SAN), acrylonitrile-butadiene-styrene (ABS), acrylic ester-styrene-acrylonitrile (ASA) or blends thereof.

14. A method according to claim 1, wherein the plastic material further comprises a polymer components.

15. A method according to claim 14, wherein the further polymer components is a polyolefin, polyamide, polyvinylchloride, polyurethane, polycarbonate, polyacrylate, polymethacrylate, polyester resin, epoxy resin, polyoxyalkylene, polyalkylene terephthalate, polyvinyl butyral or a copolymer or blend thereof.

16. A method according to claim 14, wherein the further polymer components are separated preceding step a) by means of a density separation.

17. A method according to claim 16, wherein further non-polymer components of the plastic material are separated in the density separation.

18. A method according to claim 1, wherein the plastic material further contains a low molecular additive.

19. A method according to claim 18, wherein the low molecular additive is a flame-retardant additive, a softener and stabiliser.

20. A method according to claim 19, wherein the flame retardants is a brominated flame retardant.

21. A method according to claim 19, wherein the is a phthalic acid ester, adipinic acid ester, aliphatic $C_4$-$C_8$ carboxylic acid or a polyalkylene glycol.

22. A method according to claim 18, wherein the low molecular additives remain in step b) in the solution and thus are separated from the precipitated polymers.

23. A method according to claim 20, wherein said brominated flame retardants is polybrominated diphenylether, polybrominated biphenyl, bis[dibromopropoxydibromophenyl]propane, hexabromodecane or bis-(tribromophenoxy) ethane.

* * * * *

UNITED STATES PATENT AND TRADEMARK OFFICE
CERTIFICATE OF CORRECTION

| | | |
|---|---|---|
| PATENT NO. | : 8,138,232 B2 | Page 1 of 1 |
| APPLICATION NO. | : 11/916889 | |
| DATED | : March 20, 2012 | |
| INVENTOR(S) | : Andreas Maeurer et al. | |

It is certified that error appears in the above-identified patent and that said Letters Patent is hereby corrected as shown below:

Column 5, Line 39 reads: "1. Method for recycling plastic materials which contain at" should read --1. A method for recycling plastic materials which contain at--.

Column 6, Line 32 reads: "material further comprises a polymer components." should read --material further comprises a polymer component.--.

Column 6, Line 34 reads: "polymer components is a polyolefin, polyamide, polyvinyl-" should read --polymer component is a polyolefin, polyamide, polyvinyl- --.

Column 6, Line 51 reads: "retardants is a brominated flame retardant" should read --retardant is a brominated flame retardant--.

Column 6, Line 52 reads: "21. A method according to claim 19, wherein the is a" should read --21. A method according to claim 19, wherein the softener is a--.

Signed and Sealed this
Nineteenth Day of June, 2012

David J. Kappos
*Director of the United States Patent and Trademark Office*